United States Patent
Turicchi, Jr. et al.

(10) Patent No.: US 6,628,994 B1
(45) Date of Patent: Sep. 30, 2003

(54) METHOD TO OBTAIN IMPROVED PERFORMANCE BY AUTOMATIC ADJUSTMENT OF COMPUTER SYSTEM PARAMETERS

(75) Inventors: Thomas Edwin Turicchi, Jr., Dallas, TX (US); Doug Grumann, Citrus Heights, CA (US); Steven R Landherr, Dallas, TX (US); Michael Richard Carl, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 09/651,916

(22) Filed: Aug. 31, 2000

(51) Int. Cl.[7] ........................ G05B 13/02; G06F 11/30
(52) U.S. Cl. ........................ 700/32; 700/33; 700/108; 700/174; 702/182; 702/183; 702/184; 702/185; 702/186; 702/188; 702/193; 714/47
(58) Field of Search ........................ 700/32, 33, 108, 700/174; 702/182, 183, 184, 185, 186, 188, 193; 714/47

(56) References Cited

U.S. PATENT DOCUMENTS

| | | | | |
|---|---|---|---|---|
| 5,819,030 A | * | 10/1998 | Chen et al. | 709/220 |
| 5,920,689 A | * | 7/1999 | Berry et al. | 714/47 |
| 6,047,261 A | * | 4/2000 | Siefert | 702/182 |
| 6,470,464 B2 | * | 10/2002 | Bertram et al. | 714/34 |

* cited by examiner

Primary Examiner—Ramesh Patel
Assistant Examiner—Thomas Pham

(57) ABSTRACT

A method for the automatic selection of computer system parameter values to improve system performance as workload on the system changes. Methods are disclosed for automatically making minor adjustments to computer system parameters and comparing long-term associated performance changes in order to set parameter values so as to obtain improved system performance. The time frame over which a change in a system parameter and the associated system performance change is averaged is adjustable, thus permitting evaluation over shorter or longer periods of times as deemed appropriate. An objective measure of system performance is defined prior to implementation of the present methods. For transaction based systems, average system response-time for a given demand on the system could be, for example, such a measure. For systems executing batch-type workloads, system throughput may be used as the indicator of how well the system is performing.

4 Claims, 2 Drawing Sheets

METHOD TO OBTAIN IMPROVED PERFORMANCE BY AUTOMATIC ADJUSTMENT OF COMPUTER SYSTEM PARAMETERS

FIELD OF THE INVENTION

The present invention relates generally to computer systems and, more particularly, to the automatic and continual adjustment of parameters to values that result in improved system performance even as the workload on the system changes.

BACKGROUND OF THE INVENTION

Administrators of modern computing systems generally have various parameters available that can be adjusted or configured to values that result in improved performance of the system. Size of swap space, memory dedicated to buffer-cache, maximium number of processes permitted, and maximum application data size are examples of such parameters that could be so adjusted.

With limited success, various techniques have been used to make these parameter adjustments. One common solution to this problem is for the administrator or operator to learn the details of the inner workings or operation of each application, and then speculate as to the optimal configuration of the computer system. This approach has several disadvantages: (1) it is extremely time consuming, especially since it must be repeated as each new application or workload is brought into the system, (2) there is frequently insufficient data available from the vendor of the applications to do this with any precision, (3) it is an error prone process as there are often unforseen dependencies which makes such speculation highly inaccurate, and (4) optimal system parameter values can be dependent upon application usage characteristics, which can vary from time to time.

Another solution to this problem is to build a separate mechanism for each system parameter which influences system performance and which can be adjusted. Each such mechanism would have the capability of measuring system metrics and evaluating whether or not a change in the parameter controlled by that mechanism is called for. For example, such a mechanism could control a system's virtual memory and could detect when the system either has or is in danger of running out of virtual memory. The mechanism could then recommend that the system be reconfigured to increase virtual memory. One problem with this approach is that a separate mechanism must be created for each system parameter that it is desirable to control.

Thus, there is a need for a method by which a computer system can be more effectively and efficiently improved. In particular, there is a need for a method to automatically and continually adjust system parameters to obtain improved system performance, even as the workload on the system changes.

SUMMARY OF THE INVENTION

In representative embodiments, the present patent document discloses methods for automatically making minor adjustments to computer system parameters and comparing long-term associated performance changes in order to set parameter values so as to obtain improved system performance. The time frame over which a change in a system parameter and the associated system performance change is averaged is adjustable, thus permitting evaluation over shorter or longer periods of times as deemed appropriate. An objective measure of system performance should be defined prior to implementation of the present methods. For transaction based systems, average system response-time for a given demand on the system could be, for example, such a measure. For systems executing batch-type workloads, system throughput may be used as the indicator of how well the system is performing. Also needed is a means for incrementally adjusting the value of each adjustable system parameter that influences system performance.

As the computer system runs, the representative embodiment of the present patent document adjusts parameter values over a predetermined interval. As such changes are made, system performance is measured and beneficial changes are implemented.

Representative embodiments as described in the present patent document are advantageous in that they take very little time or effort on the part of the system operator to arrive at an optimal or near optimal system configuration. Additionally, as the usage characteristics and load on the system change, this method finds and recommends improvements to the system, without requiring the operator to continuously monitor and redo previous adjustments that were performed by hand. Another benefit is that this mechanism can be used on a subset of the parameters available on a system. Thus, the operator may choose to use this method to look for improvements in obscure or less understood parameters, and make the macroscopic adjustments himself.

Additional advantages of the embodiments disclosed in the present patent document include an ability to choose a range of values for any particular system parameter, as opposed to selecting a particular value for the parameter. The range chosen could be large or small, depending how much is known regarding the impact of a change in the parameter upon system performance. As experience with the system is gained, the permitted range could be automatically reduced. Generally minor improvements in system performance would not require as large a range of permitted parameter values as might otherwise be available.

Also, if it is determined that the best setting for a parameter is at one extreme of the ranges of values, the operator can be notified and requested to extend the range.

In addition, this method can be used "offline". This method can be employed on a development or benchmark instance of the application, instead of on the production version. Improved settings could be found with very consumption of operator time, and without risking adverse affects on a production system. The ideal settings obtained using the development system could then be adapted to the production system.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
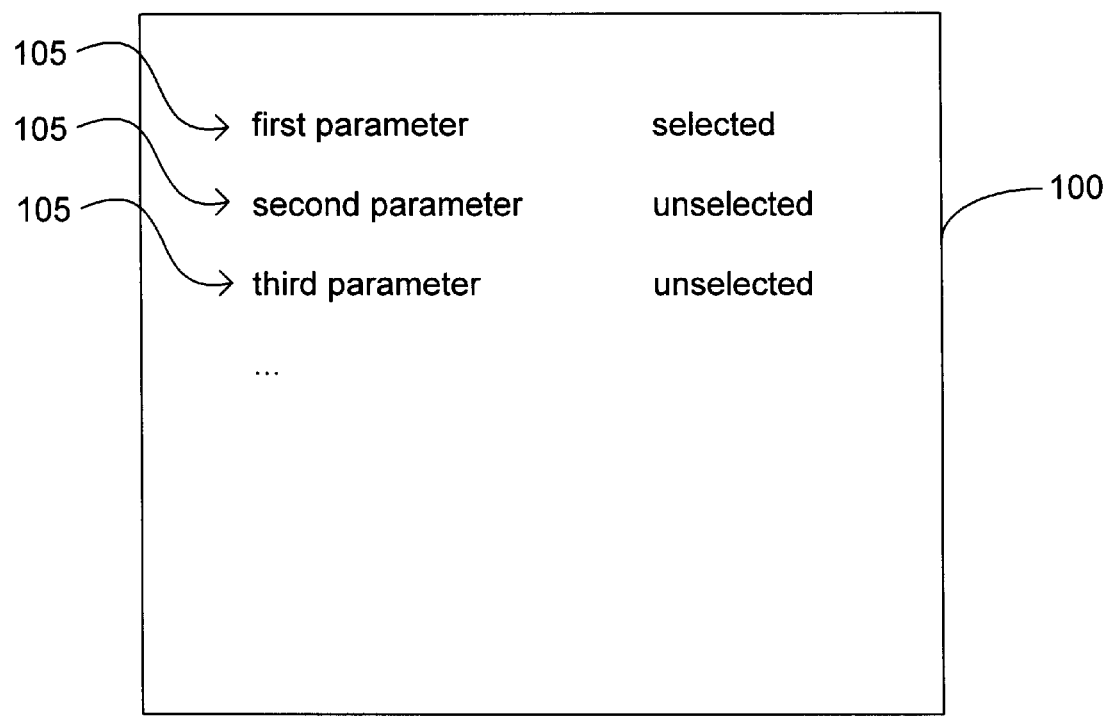
FIG. 1 is a drawing of a list of parameters used for automatic adjustment of computer system parameters as described in various representative embodiments of the present patent document.

As shown in the drawings for purposes of illustration, the present patent document relates to a novel method for the automatic and continual adjustment of computer system parameters to values that result in improved system performance. This method can continue to make appropriate adjustments even as the workload on the system changes. Previous methods for improving system performance have relied upon speculation as to the optimal system configuration or by independently controlling individual system parameters. In the following detailed description and in the several figures of the drawings, like elements are identified with like reference numerals.

In representative embodiments, the present patent document discloses methods for automatically making minor adjustments to computer system parameters and comparing long-term associated performance changes in order to set parameter values so as to obtain improved system performance. The time frame over which a change in a system parameter and the associated system performance change is averaged is adjustable, thus permitting evaluation over shorter or longer periods of times as deemed appropriate. An objective measure of system performance should be defined prior to implementation of the present methods. For transaction based systems, average system response-time for a given demand on the system could be, for example, such a measure. For systems executing batch-type workloads, system throughput may be used as the indicator of how well the system is performing. Also needed is a means for incrementally adjusting the value of each adjustable system parameter that influences system performance.

As the computer system runs, the representative embodiment of the present patent document adjusts parameter values over a predetermined interval. As such changes are made, system performance is measured and beneficial changes are implemented.

FIG. 1 is a drawing of a list 100 of parameters 105 used for automatic adjustment of computer system parameters as described in various representative embodiments of the present patent document. The parameters 105 on the list 100 are those system parameters 105 which are both adjustable and believed to influence system performance, as well as for which a decision has been made to incrementally adjust in an effort to improve system performance. The parameters 105 on this list are initially marked as "unelected". As they are selected and their values are incremented they are marked as "selected" as the first parameter 105 has been in FIG. 1.

Figure 2:
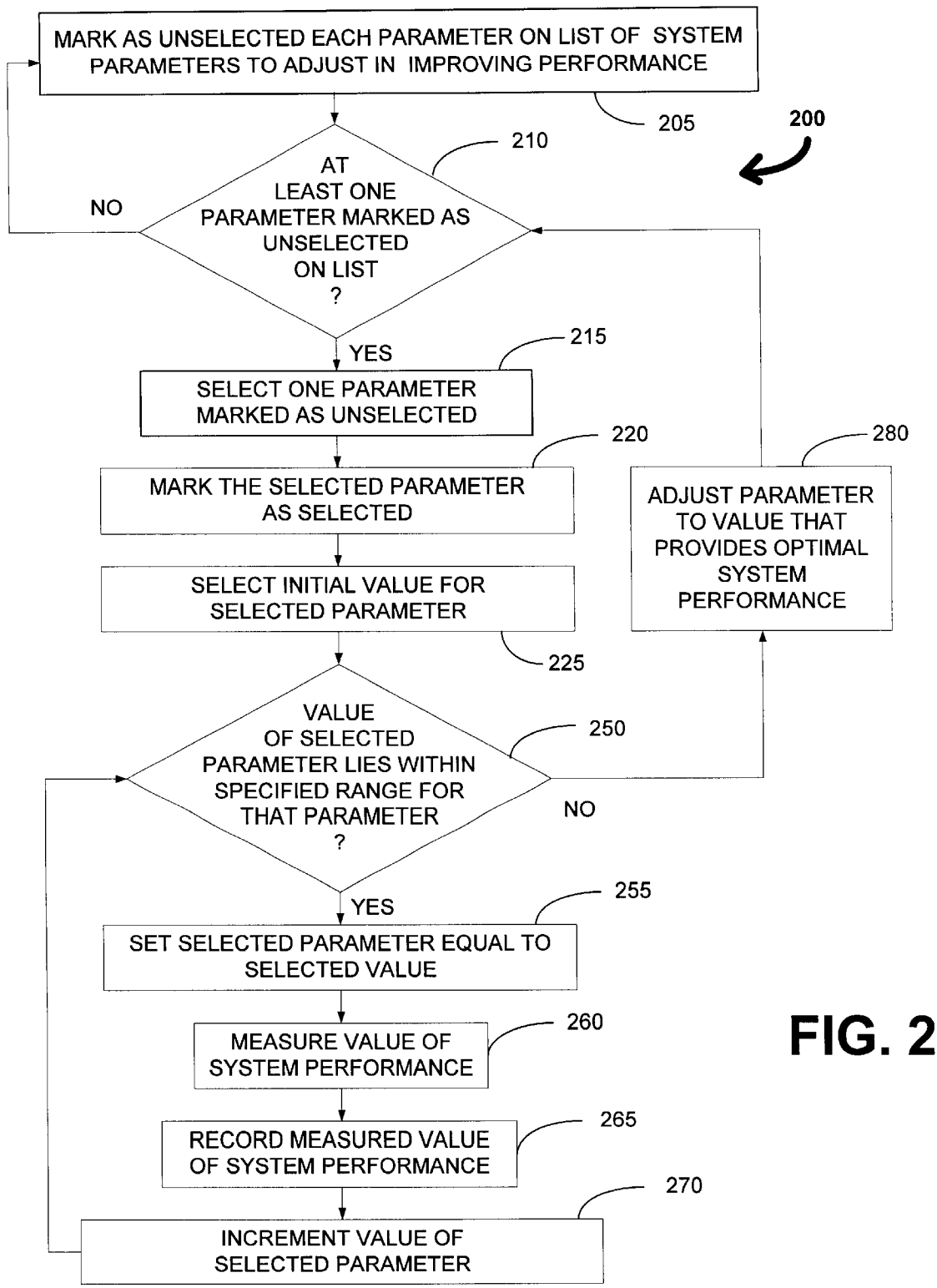
FIG. 2 is a drawing of a flow chart for a method for automatic adjustment of computer system parameters as described in various representative embodiments of the present patent document.

FIG. 2 is a drawing of a flow chart for a method 200 for automatic adjustment of computer system parameters as described in various representative embodiments of the present patent document. In block 205 each system parameter on the list 100 of FIG. 1 is marked as "unelected". Block 205 then transfers control to block 210.

When at least one parameter listed on the list 100 is marked as "unelected", block 210 transfers control to block 215. Otherwise, block 210 transfers control back to 205.

In block 215 one of the parameters 105 on the list 100 is selected. Block 215 then transfers control to block 220.

In block 220 the selected parameter 105 is marked as "selected". Block 220 then transfers control to block 225.

In block 225 an initial value is selected for the selected parameter 105. Block 225 then transfers control to block 250.

When the selected value for the selected parameter 105 lies within a specified range for that parameter 105, block 250 transfers control to block 255. Otherwise block 250 transfers control to block 280.

In block 255 the selected parameter 105 is set equal to the selected value. Block 255 then transfers control to block 260.

In block 260 the value of the system performance is measured. Block 260 then transfers control to block 265.

In block 265 the measured value of system performance is recorded. Block 265 then transfers control to block 270.

In block 270 the value of the selected parameter is incremented. Block 270 then transfers control to block 250.

In block 280 the selected parameter 105 is adjusted to the value that resulted in improved system performance for the various values to which that parameter had been set. Block 280 then transfers control to block 210.

Block 205 will then continue the process as described above.

While embodiments disclosed in the present patent document refer to automatic adjustment of computer system parameters, it should be recognized that such adjustments could be made by other means, as for example manually. However, some of the advantages disclosed herein would be reduced or possibly eliminated were the system to be implemented with other than automatic adjustment.

Representative embodiments as described in the present patent document are advantageous in that they take very little time or effort on the part of the system operator to arrive at an optimal or near optimal system configuration. Additionally, as the usage characteristics and load on the system change, this method finds and recommends improvements to the system, without requiring the operator to continuously monitor and redo previous adjustments that were performed by hand. Another benefit is that this mechanism can be used on a subset of the parameters available on a system. Thus, the operator may choose to use this method to look for improvements in obscure or less understood parameters, and make the macroscopic adjustments himself.

Additional advantages of the embodiments disclosed in the present patent document include an ability to choose a range of values for any particular system parameter, as opposed to selecting a particular value for the parameter. The range chosen could be large or small, depending how much is known regarding the impact of a change in the parameter upon system performance. As experience with the system is gained, the permitted range could be automatically reduced. Generally minor improvements in system performance would not require as large a range of permitted parameter values as might otherwise be available.

Also, if it is determined that the best setting for a parameter is at one extreme of the ranges of values, the operator can be notified and requested to extend the range.

In addition, this method can be used "offline". This method can be employed on a development or benchmark instance of the application, instead of on the production version. Improved settings could be found with very consumption of operator time, and without risking adverse affects on a production system. The ideal settings obtained using the development system could then be adapted to the production system.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiment that remains within the scope of the appended claims.

What is claimed is:

1. A computer operable method for computer system performance improvement, comprising the steps of:

when there is at least one parameter marked as unelected on a list, wherein the parameters affect computer system performance and providing at least one parameter on the list is selected from the group consisting of size of swap space, buffer-cache memory, maximum number of permitted processes, and maximum application data size, selecting one of the unelected parameters;

marking the selected parameter as selected;

selecting an initial value for the selected parameter; and when the selected value lies within a specified operating range for the selected parameter, setting the selected parameter equal to the selected value;

measuring value of computer system performance;

recording measured value of computer system performance; and incrementing the selected value; and adjusting the selected parameter to the selected value that provides improved computer system performance.

2. A program storage medium readable by a computer, tangibly embodying a software program of instructions executable by the computer to perform method steps for computer system performance improvement, the method steps comprising:

when there is at least one parameter marked as unelected on a list, wherein the parameters affect computer system performance and providing at least one parameter on the list is selected from the group consisting of size of swap space, buffer-cache memory, maximum number of permitted processes, and maximum application data size, selecting one of the unelected parameters;

marking the selected parameter as selected;

selecting an initial value for the selected parameter; and when the selected value lies within a specified operating range for the selected parameter, setting the selected parameter equal to the selected value;

measuring value of computer system performance;

recording measured value of computer system performance; and incrementing the selected value; and adjusting the selected parameter to the selected value that provides improved computer system performance.

3. A computer operable method for computer system performance improvement, comprising:

when there is at least one computer system parameter marked as unelected on a list, wherein the parameters affect computer system performance and wherein at least one parameter on the list is selected from the group consisting of size of swap space, buffer-cache memory, maximum number of permitted processes, and maximum application data size, selecting one of the unelected parameters;

marking the selected parameter as selected;

selecting an initial value for the selected parameter; and when the selected value lies within a specified operating range for the selected parameter, setting the selected parameter equal to the selected value;

measuring value of computer system performance;

recording measured value of computer system performance; and incrementing the selected value; and adjusting the selected parameter to the selected value that provides improved computer system performance.

4. A program storage medium readable by a computer, embodying a software program of instructions executable by the computer for improving computer system performance, comprising:

when there is at least one computer system parameter marked as unelected on a list, wherein the parameters affect computer system performance and wherein at least one parameter on the list is selected from the group consisting of size of swap space, buffer-cache memory, maximum number of permitted processes, and maximum application data size, selecting one of the unelected parameters;

marking the selected parameter as selected;

selecting an initial value for the selected parameter; and when the selected value lies within a specified operating range for the selected parameter, setting the selected parameter equal to the selected value;

measuring value of computer system performance;

recording measured value of computer system performance; and incrementing the selected value; and adjusting the selected parameter to the selected value that provides improved computer system performance.

* * * * *